United States Patent [19]

Gardner et al.

[11] Patent Number: 5,599,629
[45] Date of Patent: Feb. 4, 1997

[54] HIGH MODULUS PREPREGABLE EPOXY RESIN SYSTEMS

[75] Inventors: Hugh C. Gardner, Somerville; Shahid P. Qureshi, Edison, both of N.J.

[73] Assignee: Amoco Corporation, Chicago, Ill.

[21] Appl. No.: 583,359

[22] Filed: Mar. 1, 1984

[51] Int. Cl.⁶ .................................................. B32B 27/38
[52] U.S. Cl. ........................ 428/413; 528/119; 528/120; 528/121; 528/327; 528/363; 528/365
[58] Field of Search ................................ 528/119, 120, 528/121, 327, 363, 365; 428/413

[56] References Cited

U.S. PATENT DOCUMENTS

| | | | |
|---|---|---|---|
| 2,951,822 | 9/1960 | Reinking | 528/103 |
| 3,957,728 | 5/1976 | Neuray et al. | 528/202 |
| 4,404,356 | 9/1983 | Andrews | 528/119 |
| 4,458,029 | 7/1984 | Munk | 252/182 |
| 4,480,082 | 10/1984 | McLean et al. | 528/119 |
| 4,547,562 | 10/1985 | Nichols | 528/327 |
| 4,559,400 | 12/1985 | Wang et al. | 528/327 |
| 4,560,739 | 12/1985 | Zahir | 252/182 |
| 4,594,373 | 6/1986 | Kohli | 528/119 |
| 4,608,404 | 8/1986 | Gardner et al. | 528/119 |
| 4,680,341 | 7/1987 | Newman-Evans | 528/99 |

Primary Examiner—Charles T. Jordan
Assistant Examiner—John R. Hardee
Attorney, Agent, or Firm—Richard J. Schlott; Stephen L. Hensley

[57] ABSTRACT

Described herein is a composition comprising an epoxy resin containing at least one glycidyl amine group wherein the resin contains three or more epoxide groups per molecule and a particular aromatic amine hardener. These compositions possess the necessary balance of properties required for making prepreg and afford unreinforced castings with high moduli and strength.

22 Claims, No Drawings

HIGH MODULUS PREPREGABLE EPOXY RESIN SYSTEMS

BACKGROUND OF THE INVENTION

Advanced composites are high strength, high modulus materials which are finding increasing use as structural components in aircraft, automotive, and sporting goods applications. Typically they comprise structural fibers such as carbon fibers in the form of woven cloth or continuous filaments embedded in a thermosetting resin matrix.

Composite properties depend on both the matrix resin and the reinforcement. In unidirectional carbon fiber composites, important mechanical properties include longitudinal tensile strength and modulus, transverse tensile strength and modulus, and longitudinal compressive strength. The matrix affects all of these properties, but has the greatest effect on compressive strength and transverse tensile properties. High composite compressive strengths and transverse tensile moduli require that the matrix have a high modulus.

State-of-the-art epoxy matrix resin systems in advanced composites are typically based on N,N,N',N'-tetraglycidyl 4,4'-diaminodiphenyl methane and 4,4'-diaminodiphenyl sulfone. These resins produce unreinforced castings which have tensile strengths of about 8,000 psi and tensile moduli of 500,000 to 550,000 psi. Unidirectional composites containing 60 volume fraction fiber made with these matrix resins typically have transverse tensile strengths of 5,000 to 7,000 psi and transverse tensile moduli of 1.0 to 1.4 million psi. Higher transverse properties are very desirable for applications such as pressure vessels.

One reason that matrix resins containing N,N,N',N'-tetraglycidyl 4,4'-diaminodiphenyl methane and 4,4'-diaminodiphenyl sulfone are widely used in advanced composites is that they possess the balance of properties required for making prepreg, a ready-to-mold sheet of reinforcement impregrated with uncured or partially cured resin. These characteristics include: 1) a tacky, dough-like consistency, 2) low reactivity at room temperature, and 3) a high degree of cure after heating for 2 hours at 179° C. in an autoclave. Many epoxy resin systems lack at least one of these characteristics, and therefore are unsuitable for prepreg. There is a need for epoxy resin systems which are prepregable and which, when used, produce unreinforced castings which have higher tensile properties than state-of-the-art prepreg resin systems.

It has been found that compositions comprising: a) an epoxy resin containing at least one glycidyl amine group, and b) a select group of monoamines simultaneously satisfy both requirements.

U.S. Pat. No. 2,951,822 discloses epoxy resins containing glycidyl amine groups which may be cured with monoamines such as aniline and m-chloroaniline. However, the patent states that in preparing thermosetting compositions, a molar proportion of from about 0.7 to 1.3 epoxy groups per NH group is used. This represents a ratio of equivalents of amine NH groups to equivalents of epoxide groups of 0.77 to 1.43.

In the present invention it has been found that in a composition containing an epoxy resin having at least one glycidyl amine group and a particular aromatic amine hardener, the ratio of equivalents of amine NH groups to equivalents of epoxide groups must be less than 0.77 (that ratio required by the prior art) to simultaneously achieve prepregability and high matrix strengths and moduli.

THE INVENTION

This invention is directed to a composition comprising:

(a) an epoxy resin containing at least one glycidyl amine group wherein the resin contains three or more epoxide groups per molecule, and (b) an aromatic amine hardener characterized by the following formula:

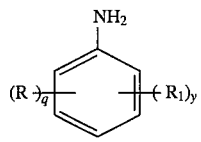

wherein R is alkyl of 1 to 4 carbon atoms, $R_1$ is independently an electron withdrawing group selected from —$CF_3$, —CN,

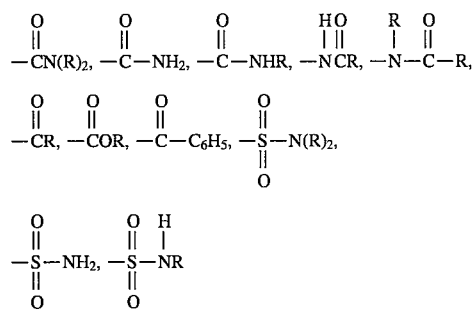

or halogen, y is 1 or 2 and q is 0 or 1, wherein the ratio of equivalents of amine NH groups in (b) to the equivalents of epoxide groups in (a) is 0.1 to 0.7.

The compositions may optionally contain (c) a thermoplastic polymer, and or (d) a structural fiber.

The preferred epoxy resins include N,N,N',N'-tetraglycidyl meta-xylylenediamine; N,N,N',N'-tetraglycidyl 1,3-bis(aminomethyl) cyclohexane; the triglycidyl ether of meta-aminophenol; the triglycidyl ether of para-aminophenol; and N,N,N'N'-tetraglycidyl 4,4'-diaminodiphenyl methane, and triglycidyl isocyanurate.

The epoxy resins may be used with up to 40 percent by weight of coepoxide resins containing two or more epoxy groups having the following formula:

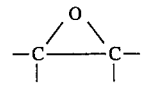

(I)

The epoxy groups can be terminal epoxy groups or internal epoxy groups. Coepoxides are of two general types: polyglycidyl compounds or products derived from epoxidation of dienes or polyenes. Polyglycidyl compounds contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide resin contains glycidyl ether groups. A preferred group of polyglycidyl compounds are made via condensation reactions with 2,2-bis(4-hydroxyphenyl)propane, also known as bisphenol A, and have structures such as II:

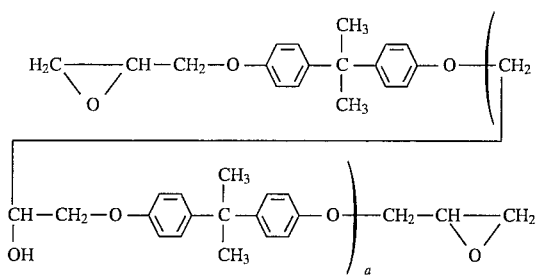

where "a" has a value from about 0 to about 15. These epoxides are bisphenol-A epoxy resins. They are available commercially under the trade names such as "Epon 828," "Epon 1001", and "Epon 1009" from Shell Chemical Co., and as "DER 331", and "DER 334" from Dow Chemical Co. The most preferred bisphenol A epoxy resins have an "a" value between 0 and 10.

Polyepoxides which are polyglycidyl ethers of 4,4'-dihydroxydiphenyl methane, 4,4'-dihydroxydiphenyl sulfone, 4,4'-biphenol, 4,4'-dihydroxydiphenyl sulfide, phenolphthalein, resorcinol, 2,2'-biphenol, or tris(4-hydroxyphenyl) methane and the like, are useful in this invention. In addition, EPON 1031 (a tetraglycidyl derivative of 1,1,2,2-tetrakis(hydroxyphenyl)ethane from Shell Chemical Company), and Apogen 101, (a methylolated bisphenol A resin from Schaefer Chemical Co.) may also be used. Halogenated polyglycidyl compounds such as D.E.R. 580 (a brominated bisphenol A epoxy resin from Dow Chemical Company) are also useful. Other suitable epoxy resins include polyepoxides prepared from polyols such as pentaerythritol, glycerol, butanediol or trimethylolpropane and an epihalohydrin.

Polyglycidyl derivatives of phenol-formaldehyde novolaks such as III where b=0.1 to 8 and cresol-formaldehyde novolaks such as IV where b=0.1 to 8 are also useable.

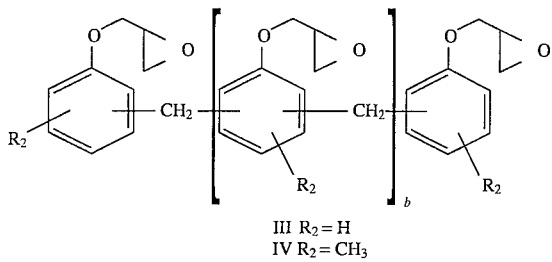

III $R_2 = H$
IV $R_2 = CH_3$

The former are commercially available as D.E.N 431, D.E.N. 438, and D.E.N. 485 from Dow Chemical Company. The latter are available as, for example, ECN 1235, ECN 1273, and ECN 1299 (obtained from Ciba-Geigy Corporation, Ardsley, N.Y.). Other epoxidized novolaks such as SU-8 (obtained from Celanese Polymer Specialties Company, Louisville, Ky.) are also suitable.

Also suitable for use herein are the glycidyl esters of carboxylic acids. Such glycidyl esters include, for example, diglycidyl phthalate, diglycidyl terephthalate, diglycidyl isophthalate, and diglycidyl adipate. There may also be used polyepoxides such as triglycidyl cyanurates N,N-diglycidyl oxamides, N,N'-diglycidyl derivatives of hydantoins such as "XB 2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis [3-(2,3-epoxypropoxy)propyl]-2,4,6,8,10-pentamethylcyclopentasiloxane and the diglycidyl ether of 1,3-bis-(3-hydroxypropyl)tetramethyldisiloxane are also useable.

The second group of epoxy resins is prepared by epoxidation of dienes or polyenes. Resins of this type include bis(2,3-epoxycyclopentyl) ether, V,

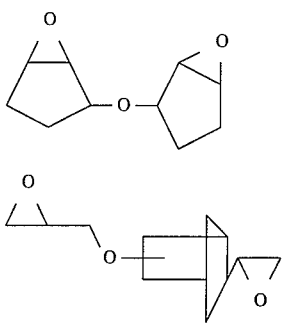

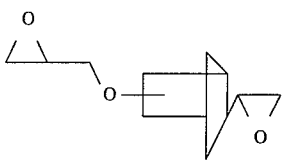

reaction products of V with ethylene glycol which are described in U.S. Pat. No. 3,398,102, 5(6)-glycidyl-2-(1,2-epoxyethyl)bicyclo[2.2.1] heptane, VI, and dicyclopentadiene diepoxide. Commercial examples of these epoxides include vinycyclohexene dioxide, e.g., "ERL-4206" (obtained from Union Carbide Corp.), 3,4-epoxycyclohexylmethyl 3,4-epoxycyclohexane carboxylate, e.g., "ERL-4221" (obtained from Union Carbide Corp.), 3,4-epoxy-6-methylcyclohexylmethyl 3,4-epoxy-6-methylcyclohexane carboxylate, e.g., "ERL-4201" (obtained from Union Carbide Corp.), bis(3,4-epoxy-6-methylcyclohexylmethyl) adipate, e.g., "ERL-4289" (obtained from Union Carbide Corp.), dipentene dioxide, e.g., "ERL-4269" (obtained from Union Carbide Corp.) 2-(3,4-epoxycyclohexyl-5,5-spiro-3, 4-epoxy)cyclohexane meta-dioxane, e.g., "ERL-4234" (obtained from Union Carbide Corp.) and epoxidized polybutadiene, e.g., "Oxiron 2001" (obtained from FMC Corp.)

Other suitable cycloaliphatic epoxides include those described in U.S. Pat. Nos. 2,750,395; 2,890,194; and 3,318,822 which are incorporated herein by reference, and the following:

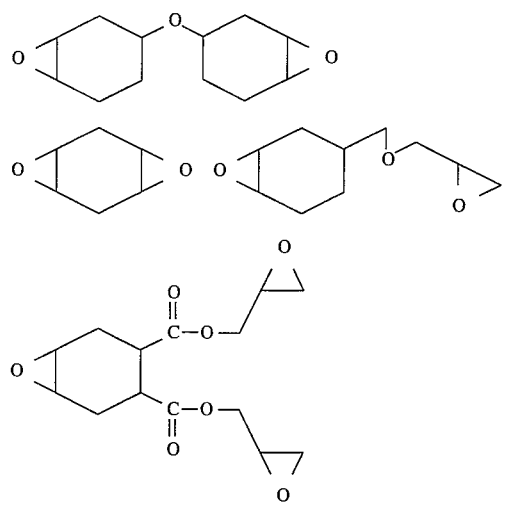

-continued

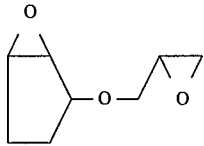

Other suitable epoxides include:

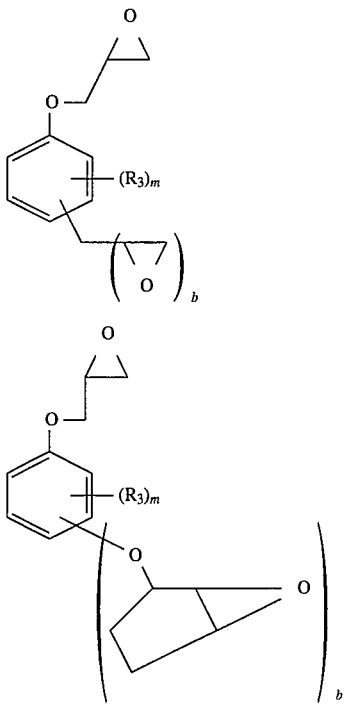

where c is 1 to 4, m is (5-c), and $R_3$ is H, halogen, or $C_1$ to $C_4$ alkyl.

Reactive diluents containing one epoxide group such as t-butylphenyl glycidyl ether may also be used. The reactive diluent may comprise up to 25 percent by weight of the epoxide component.

The preferred co-epoxy resins are bisphenol A epoxy resins of formula II where a is between 0 and 5, and epoxidized novolak resins of formula III and IV where b is between 0 and 3.

The preferred amines include 3-amino-4-methylbenzamide, 3-amino-4-methylsulfonamide, 3-aminoacetanilide. 3-aminoacetophenone, 4-aminoacetophenone, 3-amino-1-trifluoromethylbenzene, 4-aminoacetanilide, 4-amino-1-trifluoromethylbenzene, N-methyl 3-amino-4-methylbenzamide, 3-amino-4-ethylbenzamide, or 3-amino-4-methoxybenzamide, or mixtures thereof.

The amines of this invention may be used in combination with conventional aromatic diamines. Examples of conventional diamines include 4,4'-diaminodiphenyl ether, 4,4'-diaminodiphenyl methane, 3,3'-diaminodiphenyl methane, 4,4'-diaminodiphenyl sulfone, 3,3'-diaminodiphenyl sulfone, 3,3'-diaminobenzophenone, diethyltoluenediamine, m-phenylenediamine, p-phenylenediamine, 4,4'-diaminodiphenylpropane, 4,4'-diaminodiphenyl sulfide, 1,4-bis(p-aminophenoxy)benzene, 1,4-bis(m-aminophenoxy)benzene, 1,3-bis-(m-aminophenoxy)benzene, 1,3-bis(p-aminophenoxy) benzene, 4,4'-bis(3-aminophenoxy)diphenyl sulfone, and trimethylene glycol di-4-aminobenzoate, and 2,2-bis(4-aminophenoxyphenyl) propane.

The co-amines may be used in amounts of up to 40 weight percent of component (b).

The compositions of this invention may optionally contain a thermoplastic polymer. These materials have beneficial effects on the viscosity and film strength characteristics of the epoxy/hardener mixture.

The thermoplastic polymers used in this invention include polyarylethers of formula VII which are described in U.S. Pat. Nos. 4,108,837 and 4,175,175,

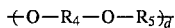  VII wherein $R_4$ is a residuum of a dihydric phenol such as bisphenol A, hydroquinone, resorcinol. 4,4-biphenol, 4,4'-dihydroxydiphenyl sulfone, 4,4'-dihydroxy-3,3', 5,5'-tetramethyldiphenyl sulfide 4,4'-dihydroxy-3,3',5,5'-tetramethyldiphenyl sulfone and the like. $R_5$ is a residuum of a benzenoid compound susceptible to nucleophilic aromatic substitution reactions such as 4,4'-dichlorodiphenyl sulfone, 4,4'-difluorobenzophenone, and the like. The average value of d is from about 8 to about 120.

These polymers may have terminal groups which react with epoxy resins, such as hydroxyl or carboxyl, or terminal groups which do not react.

Other suitable polyarylethers are described in U.S. Pat. No. 3,332,209.

Also suitable are polyhydroxyethers of formula VIII.

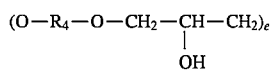  VIII where $R_4$ has the same meaning as for Formula VII and the average value of e is between about 8 and about. 300; and polycarbonates such as those based on bisphenol A, tetramethyl bisphenol A, 4,4'-dihydroxydiphenyl sulfone, 4,4'-dihydroxy-3,3',5,5'tetramethyl- diphenyl sulfone, hydroquinone, resorcinol, 4,4'-dihydroxy-3,3',5,5'-tetramethyl diphenyl sulfide, 4,4'biphenol, 4,4'-dihydroxydiphenyl sulfide, phenolphthalein, 2,2,4,4-tetramethyl-1,3-cyclobutanediol, and the like, Other suitable thermoplastics include poly (ε-caprolactone); polybutadiene; polybutadiene/acrylonitrile copolymers, including those optionally containing amine, carboxyl, hydroxy, or —SH groups; polyesters, such as poly(butylene terephthalate); poly(ethylene terephthalate); polyetherimides such as the Ultem resins (obtained from the General Electric Company); acrylonitrile/butadiene/styrene terpolymers, polyamides such as nylon 6, nylon 6,6, nylon 6,12, and Trogamid T (obtained from Dynamit Nobel Corporation); poly(amide imides) such as Torlon poly(amide imide) (obtained from Amoco Chemical Corporation, Napierville, Ill.); polyolefins; polyethylene oxide; poly(butyl methacrylate); impact-modified polystyrene; sulfonated polyethylene; polyarylates such as those derived from bisphenol A and isophthalic and terephthalic acid; poly(2, 6-dimethyl phenylene oxide); polyvinyl chloride and its copolymers; polyacetals; polyphenylene sulfide and the like.

The composition may additionally contain an accelerator to increase the rate of cure. Accelerators which may be used herein include Lewis acid:amine complexes Such as $BF_3$.monoethylamine, $BF_3$-piperdine, $BF_3$.2-methylimidazole; amines, such as imidazole and its derivatives such as 4-ethyl-2-methylimidazole, 1-methylimidazole, 2-methylimidazole; N,N-dimethylbenzylamine; acid salts of tertiary amines, such as the p-toluene sulfonic acid:imidazole complex, and organophosphonium halides. These accelerators are generally used in amounts of from 0.1 to about 3 weight percent based on the epoxy resin.

The structural fibers which are useful in this invention include carbon, graphite, glass. silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers. chopped fiber or random mat. The preferred fibers are carbon fibers, aromatic polyamide fibers, such as Kevlar 49 fiber (obtained from E.I. dupont de Nemours, Inc., Wilmington, Del.), and silicon carbide fibers.

The composition contains from about 30 to about 90, preferably from about 40 to about 85 weight percent of the epoxy resin; from about 10 to about 70, preferably from about 12 to about 50 weight percent of the aromatic amine; up to about 25 percent, preferably up to 15 percent by weight of thermoplastic polymer, and up to about 85 percent, preferably from about 20 to about 80 percent of structural fiber.

Preimpregnated reinforcement may be made from the compositions of this invention by combining epoxy resin, hardener, and optionally thermoplastic polymer with the structural fiber.

Preimpregnated reinforcement may be prepared by several techniques known in the art, such as wet winding or hot melt.

In the hot melt process, partially advanced resin mixtures are coated as a thin film onto a silicone coated release paper. Prepreg is made by passing a ribbon of fiber between two plies of coated release paper in a prepreg machine, where under the action of heat and pressure, the resin mixture is transferred from the paper to the fibers. Not all epoxy amine mixtures may be used in the hot melt process since they lack the required film forming and reactivity characteristics. Prepreg made by this process is typically taken up on a spool. It is used within a few days or may be stored for months at 0° F.

During prepreg manufacture, the resin system "B-stages", or partially advances.

Tacky drapable prepreg can be obtained using the compositions of this invention. Due to the low room temperature (25° C.) reactivity of the hardeners of this invention, long prepreg shelf lives can be obtained-typically one to three weeks.

Composites may be prepared by curing preimpregnated reinforcement using heat and pressure. Vacuum bag/autoclave cures work well with these compositions. Laminates may also be prepared via wet layup followed by compression molding, resin transfer molding, or by resin injection, as described in European Patent Application 0019149 published Nov. 26, 1980. Typical cure temperatures are 100° F. to 500° F., preferably 180° F. to 450° F.

The compositions of this invention may be used for filament winding. In this composite fabrication process, continuous reinforcement in the form of tape or tow—either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

The compositions of this invention may be used as aircraft parts such as wing skins, wing-to-body fairings, floor panels, flaps, radomes; as automotive parts such as driveshafts, bumpers, and springs; and as pressure vessels, tanks and pipes. They are also suitable for sporting goods applications such as golf shafts, tennis rackets, and fishing rods.

In addition to structural fibers, the composition may also contain particulate fillers such as talc, mica, calcium carbonate, aluminum trihydrate, glass microballoons, phenolic thermospheres, and carbon black. Up to half of the weight structural fiber in the composition may be replaced by filler. Thixotropic agents such as fumed silica may also be used.

Further, the compositions may be used in adhesives, potting and encapsulation, and coating applications.

EXAMPLES

The following examples serve to give specific illustrations of the practice of this invention but they are not intended in any way to limit the scope of this invention.

In the Examples which follow, the epoxy equivalent weight (EEW) is defined as the grams of epoxy resin per mole of 1,2 epoxide group. The following materials were used:

PGAX—A commercial grade of N,N,N',N'-tetraglycidyl meta-xylylenediamine, (obtained from the Sherwin Williams Company, Chicago, Ill.)

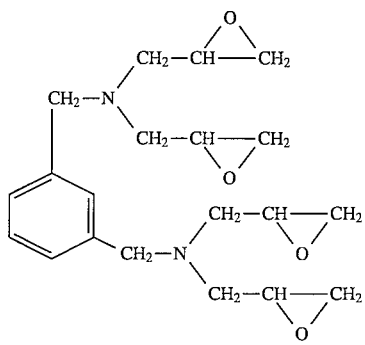

(EEW = 102)

PGAC—A commercial grade of N,N,N',N'-tetraglycidyl 1.3-bis(aminomethyl) cyclohexane obtained from Sherwin Williams

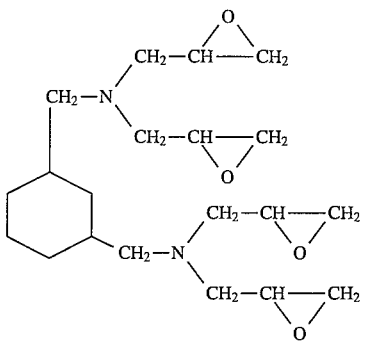

(EEW = 105)

Glyamine-115—A commercial grade of N,N,O-triglycidyl meta-aminophenol, (obtained from F.I.C. Corporation, San Francisco, Calif.).

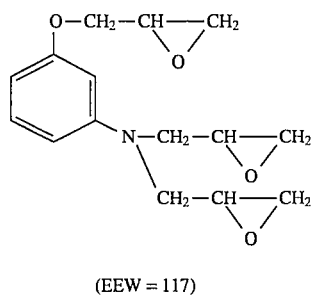

(EEW = 117)

MY-720—A commercial grade of N,N,N',N'-tetraglycidyl 4,4'-diaminodiphenyl methane, (obtained from Ciba Geigy Corporation, Ardsley, N.Y.)

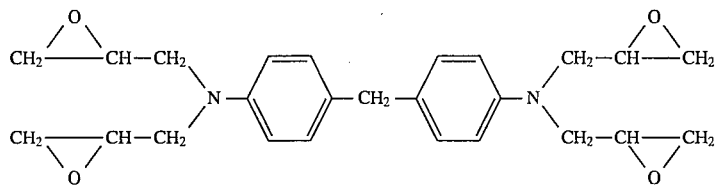

(EEW = 126)

AMBA 3-Amino-4-methylbenzamide (obtained from Aceto Chemicals, New York, N.Y.):

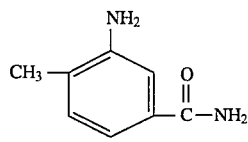

AAP—3-Aminoacetophenone (obtained from Aldrich Chemical Co. Milwaukee. Wis.):

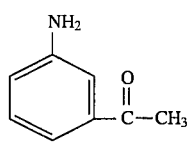

Control A

A thermosetting epoxy resin formulation was prepared by blending 75 g of N,N,N',N'-tetraglycidyl meta-xylylenediamine with 57 g of 3-amino-4-methylbenzamide.

Example 1

A thermosetting epoxy resin formulation was prepared by blending 100 g of N,N,N',N'-tetraglycidyl meta-xylylenediamine with 37 g of 3-amino-4-methylbenzamide.

Example 2

A thermosetting epoxy resin formulation was prepared by blending 100 g of N,N,N'N'-tetraglycidyl meta-xylylenediamine with 22 g of 3-amino-4-methylbenzamide.

Example 3

An epoxy resin blend was prepared by combining 160 g of N,N,N',N'-tetraglycidyl meta-xylylenediamine with 40 g of a bisphenol A epoxy resin (EEW 189) at a temperature of 50° C. A thermosetting epoxy formulation was prepared by combining this blend with 68 g of 3-amino-4-methylbenzamide.

Example 4

An epoxy resin blend was prepared by combining 50 g of N,N,N',N'-tetraglycidyl meta-xylylenediamine with 50 g of N,N,O-triglycidyl meta-aminophenol at a temperature of 50° C. A thermosetting epoxy formulation was prepared by combining this blend with 35 g of 3-amino-4-methylbenzamide.

Example 5

A thermosetting epoxy resin formulation was prepared by blending 75 g of N,N,N',N'-tetraglycidyl meta-xylylenediamine with 25.5 g of 3-aminoacetophenone.

Control B

A thermosetting epoxy resin formulation was prepared by blending 75 g of N,N,N',N'-tetraglycidyl meta-xylylenediamine with 49.5 g of 3-aminoacetophenone.

Example 6

A thermosetting epoxy resin formulation was prepared by blending 105 g of N,N,N',N'-tetraglycidyl 1,3-bis(aminomethyl) cyclohexane with 38 g of 3-amino-4-methylbenzamide.

Example 7

A thermosetting epoxy resin formulation was prepared by blending 100 g of N,N,N',N'-tetraglycidyl 4,4'-diaminodiphenyl methane with 25 g of 3-amino-4-methylbenzamide.

Example 8

An epoxy resin blend was prepared by combining 80 g of N,N,N',N'-tetraglycidyl 4,4'-diaminodiphenyl methane with 20 g of bisphenol-A epoxy resin (EEW 189) at a temperature of 70° C. A thermosetting epoxy formulation was prepared by combining this blend with 28 g of 3-amino-4-methylbenzamide.

Control C

N,N,N',N'-tetraglycidyl 4,4'-diaminodiphenyl methane, 100 g, was heated without amine hardener.

Unreinforced castings were prepared from the formulations described in the above Examples and Controls. Casting dimensions were ⅛×8×5 to 8 inches. Typically they weighed 100 to 160 g.

Control C (MY-720 without an amine) did not cure, whereas in Example 7, a hard, strong casting was formed using the amine curing agent of this invention.

TABLE 1

Properties of Unreinforced Castings

| Examples | Control A | 1 | 2 | 3 | 4 | 5 | Control B |
|---|---|---|---|---|---|---|---|
| Epoxy/Amine (weight ratio) | PGAX/AMBA (75/57) | PGAX/AMBA (100/37) | PGAX/AMBA (100/22) | PGAX/A-9527/AMBA (160/40/68) | PGAX/Gly-115/AMBA (50/50/35) | PGAX/ACP (75/25.5) | PGAX/ACP (75/49.5) |
| Amine N—H/Epoxide (Mole Ratio) | 1.0 | 0.5 | 0.3 | 0.5 | 0.5 | 0.5 | 1.0 |
| Tensile Strength ($10^3$ psi) | —[b] | 14.4 | 13.4 | 14.0 | 11.1 | 12.5 | 3.0 |
| Tensile Modulus ($10^3$ psi) | —[b] | 730 | 690 | 700 | 740 | 670 | 660 |
| Strain-to-Failure | —[b] | 2.2 | 2.0 | 2.3 | 1.6 | 2.1 | 0.5 |
| HDT (°C.)[a] | —[b] | 122 | 134 | 120 | 131 | 103 | 82 |

| Examples | 6 | 7 | 8 | Control C |
|---|---|---|---|---|
| Epoxy/Amine (weight ratio) | PGAC/AMBA (105/38) | MY-720/AMBA (100/25) | MY-720/A-9527/AMBA (80/20/28) | MY-720 |
| Amine NH/epoxide (Mole Ratio) | 0.5 | 0.5 | 0.5 | 0 |
| Tensile Strength ($10^3$ psi) | 12.1 | 9.1 | 10.7 | Did not cure |
| Tensile Modulus ($10^3$ psi) | 615 | 617 | 610 | " |
| Strain-to-Failure (%) | 2.1 | 2.1 | 2.0 | " |
| HDT (°C.) | 126 | 164 | 153 | " |

[a]Heat deflection temperature.
[b]Too brittle to test.
A-9527: Bisphenol A epoxy resin (EEW 189) from Ciba Geigy Corporation The general procedure for making castings was the following: The epoxy resin was charged to a 3-necked flask equipped with a paddle stirrer. The contents of the flask were heated at a temperature of from 100° to 110° C. and stirred. The amine hardener was added to this solution. It dissolved in about 10 minutes. The resulting solution was subjected to a vacuum to remove air bubbles for about 5 to 30 minutes. It was then poured into a preheated glass mold with a cavity of dimensions ⅛×8×8 inches, and cured with a programmed heating cycle: 4 to 5 hours at 100° C., 6 hours at 120° C., and finally 2 hours at 179° C.

Castings were tested to determine mechanical properties. Tensile properties were measured according to ASTM D-638 using a Type I dogbone specimen. Heat deflection temperatures were measured according to ASTM D-648 (264 psi stress).

Table I summarizes the properties of unreinforced castings.

The following conclusions are drawn from the data in Table 1:

The castings in Examples 1 to 5 have high tensile strengths and very high tensile moduli. These castings, as well as those in Examples 6 through 8, were cured with the amine N—H: epoxide stoichiometry of this invention. In contrast, the castings in Controls A and B, which contained an amine N—H: epoxide stoichiometry of 1.0, had inferior tensile properties compared to the corresponding compositions of this invention (Examples 1 and 5, respectively).

Example 9 and Control D describe the prepregging characteristics of selected formulations. Systems suitable for making prepreg via the hot melt process form uniform, tacky films when spread on a silicone treated release paper after moderate heating to advance the molecular weight of the resin. The preferred formulations can be held at their coating temperature (e.g. 85° C.) for several hours before advancing to the point where they produce a film which is brittle and nontacky at room temperature.

Example 9

A mixture of 7.4 g of 3-amino-4-methylbenzamide and 20 g of N,N,N',N'-tetraglycidyl meta-xylylenediamine was heated at a temperature of 100° C. for 45 minutes, followed by 30 minutes at a temperature of 85° C. A tacky, uniform film was cast from this mixture. The resin/hardener mixture was maintained for 3 more hours at 85° C. At the end of this period, a tacky uniform film was prepared.

Control D

N,N,N',N'-tetraglycidyl metaxylylenediamine, 20 g, was heated at a temperature of 85° C. Samples were removed periodically in an attempt to cast a uniform, tacky film. Even after 8 hours, a uniform film was not obtained. Comparing this result with that in Example 9 indicates that an amine hardener is needed to produce a film suitable for prepregging.

Example 10 describes the preparation of unidirectional carbon fiber prepreg using the composition of this invention. The prepreg per ply thickness was approximately 6 mils. The prepreg was made using a polyacrylonitrile—based carbon fiber with a tensile strength of $6.6 \times 10^5$ psi and a tensile modulus of $36 \times 10^6$ psi.

Example 10

N,N,N',N'-tetraglycidyl meta-xylylenediamine, 500 g, was charged to a 3 liter flask equipped with a paddle stirrer, thermometer with Therm-o-watch control unit, vent to a bubbler, and an electric heating mantle. The resin was heated to a temperature of 100° C. and held at that temperature as 185 g of 3-amino-4-methylbenzamide was added over a period of 30 minutes. After the mixture was cooled to a temperature of 85° C. over a 20 minute period and held at that temperature for another 25 minutes, it was poured into a pan of a resin coater. Seven-inch wide 0.005-inch thick film was coated at a temperature of 75° C. on a differential release paper (type 2-6OSF-157 and 168B from Dauberr Coated Products, Dixon, Ill.). A 6-inch wide ribbon of carbon fiber was passed through a heating chamber of the prepreg machine along with coated resin paper on top and bottom. The resin was melted on the fiber ribbon at a temperature of 90° to 100° C. The finished tape contained approximately 33.5 percent resin by weight and was 6 inches wide.

Examples 11 and 12 describe the preparation and tensile properties of a cured laminate.

Example 11

A unidirectional laminate was prepared by stacking 8 plies of the preimpregnated tape made in Example 10 in a mold, covering them with a teflon impregnated spacer and bleeder cloths, and enclosing them in a nylon bag. The entire assembly was placed in an autoclave and cured. Longitudinal tensile properties were measured at ambient temperature according to ASTM-D3039. Results and cure schedule are shown in Table II.

Example 12

A unidirectional laminate was prepared by stacking 20 plies of 6-inch wide tape in a mold, and curing it in an autoclave as described in Example 11.

Transverse tensile specimens (perpendicular to the fiber direction) were prepared from the cured laminate and were tested according to ASTM-D3039. The results are shown in Table II.

TABLE II

| Composite Properties[a] |  |
|---|---|
| Longitudinal |  |
| Tensile Strength ($10^3$ psi) | 384 |
| Tensile Modulus ($10^6$ psi) | 21.9 |
| Strain-to-Failure (%) | 1.57 |
| Fiber Content (Vol %) | 63 |
| Layup Example | 11 |
| Transverse |  |
| Tensile Strength ($10^3$ psi) | 9.2 |
| Tensile Modulus ($10^6$ psi) | 1.77 |
| Strain-to-Failure (%) | 0.54 |
| Fiber Content (Vol %) | 65 |
| Layup Example | 12 |

[a]Cure Schedule: Apply vacuum to bag. Pressurize autoclave to 85 psi. Heat from 70° F. to 240° F. at 3° F./min. Hold 1 hour at 240° F. Then vent bag to the atmosphere and increase autoclave pressure to 100 psi. Heat from 240° F. to 350° F. at 3° F./min. Hold at 350° F. for 6 hours.

It is clear that the compositions of this invention give composites with a high level of mechanical properties. The transverse tensile modulus of the laminate is significantly higher than that based on laminates made with state-of-the-art epoxy prepreg formulations.

What is claimed is:

1. A composition comprising:

(a) an epoxy resin containing at least one glycidyl amine group wherein the resin contains three or more epoxide groups per molecule, and (b) an aromatic amine hardener characterized by the following formula:

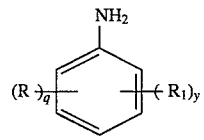

wherein R is alkyl of 1 to 4 carbon atoms, $R_1$ is independently an electron withdrawing group selected from —$CF_3$, —CN,

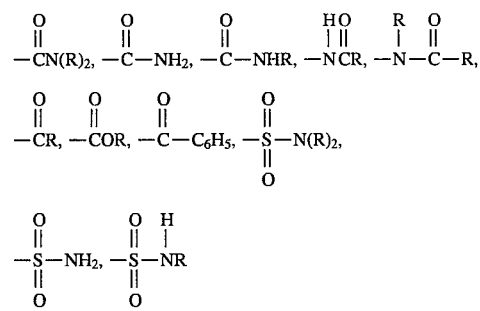

or halogen, y is 1 or 2 and q is 0 or 1, wherein the ratio of equivalents of amine NH groups in (b) to the equivalents of epoxide groups in (a) is 0.1 to 0.7.

2. A composition as defined in claim 1 where the epoxy resin is selected from one or more of the following: N,N,N',N'-tetraglycidyl meta-xylylenediamine; N,N,N',N'-tetraglycidyl 1,3-bis(aminomethyl) cyclohexane; the triglycidyl ether of meta-aminophenol; the triglycidyl ether of para-aminophenol; and N,N,N'N'-tetraglycidyl 4,4'-diaminodiphenyl methane, and triglycidyl isocyanurate.

3. A composition as defined in claim 1 wherein the amine is selected from: 3-amino-4-methylbenzamide, 3-amino-4-methylsulfonamide, 3-aminoacetanilide, 3-aminoacetophenone, 4-aminoacetophenone, 3-amino-1-trifluoromethylbenzene, 4-aminoacetanilide, 4-amino-1-trifluoromethylbenzene, N-methyl 3-amino-4-methylbenzamide, 3-amino-4-ethylbenzamide, 3-amino-4-methoxybenzamide, or mixtures thereof.

4. A composition as defined in claim 1 which contains up to 40 percent by weight of a coepoxy resin.

5. A composition as defined in claim 4 wherein the coepoxy resin is of the following structure:

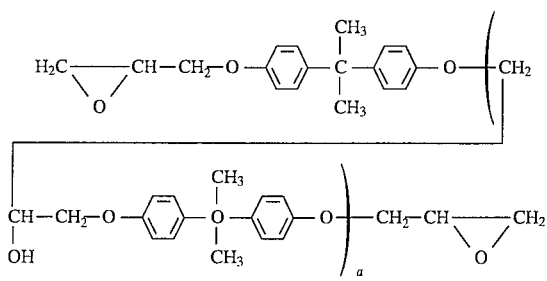

wherein a is 0 to 15.

6. A composition as defined in claim 4 wherein the coepoxy resin is a phenol-formaldehyde novolak of the following formula:

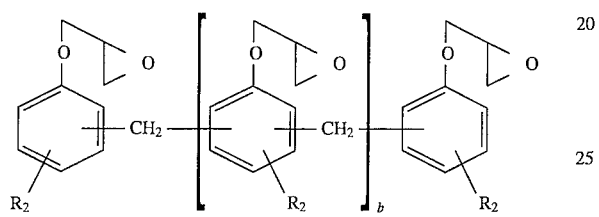

wherein b is from 0.1 to about 8 and $R_2$ is hydrogen.

7. A composition as defined in claim 4 wherein the coepoxy resin is a cresol-formaldehyde novolak of the following formula

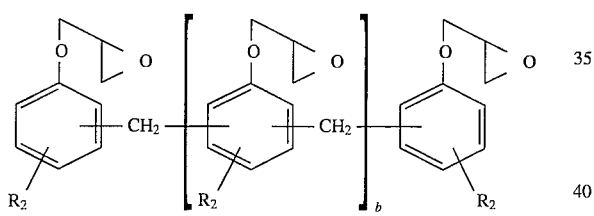

wherein b is from 0.1 to about 8 and $R_2$ is $CH_3$.

8. A composition as defined in claim 1 which contains a structural fiber selected from carbon, graphite, glass, silicon carbide, poly(benzothiazole), poly(benzimidazole), poly(benzoxazole), alumina, titania, boron, aromatic polyamides, or combinations thereof.

9. A composition as defined in claims 1 or 8 which contains a thermoplastic polymer.

10. A composition as defined in claim 9 wherein the thermoplastic polymer is selected from one or more of a poly(aryl ether), a polyhydroxyether, a polycarbonate, a poly(ε-caprolactone), a polybutadiene/acrylonitrile copolymer, a polyester, an acrylonitrile/butadiene/styrene terpolymer, a polyamide, a poly(amide imide), a polyolefin, a polyethylene oxide, a polybutyl methacrylate, an impact-modified polystyrene, a sulfonated polyethylene, a polyarylate, poly(2,6-dimethyl phenylene oxide), polyvinyl chloride and its copolymers, polyphenylene sulfide and a polyacetal.

11. A composition as defined in claim 10 wherein the thermoplastic polymer is a polysulfone.

12. A composition as defined in claim 10 wherein the thermoplastic polymer is a polyhydroxyether.

13. A composition as defined in claim 10 wherein the thermoplastic polymer is a polycarbonate.

14. A composition as defined in claim 10 wherein the thermoplastic polymer is a polyetherimide.

15. A composition as defined in claim 10 wherein the thermoplastic polymer is a polyarylate.

16. A composition as defined in claims 1 or 8 or 10 which contains an accelerator which increases the rate of cure.

17. A prepreg comprising
(i) A composition comprising
(a) an epoxy resin containing at least one glycidyl amine group wherein the resin contains three or more epoxide groups per molecule, and
(b) an aromatic amine hardener characterized by the following formula:

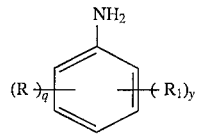

wherein R is alkyl of 1 to 4 carbon atoms, $R_1$ is independently an electron withdrawing group selected from $-CF_3$, $-CN$,

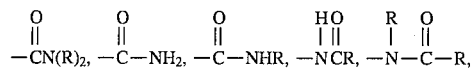

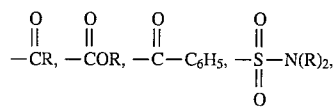

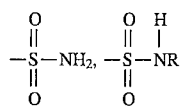

or halogen, y is 1 or 2 and q is 0 or 1, wherein the ratio of equivalents of amine NH groups in (b) to the equivalents of epoxide groups in (a) is 0.1 to 0.7, and
(ii) a structural fiber.

18. A prepreg as defined in claim 17 which contains an accelerator which increases the rate of cure.

19. A prepreg as defined in claims 17 or 18 which contains a thermoplastic polymer.

20. A composite comprising:
(i) a matrix resin comprising
(a) an epoxy resin containing at least one glycidyl amine group wherein the resin contains three or more epoxide groups per molecule, and
(b) an aromatic amine hardener characterized by the following formula:

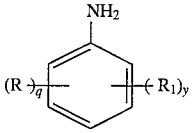

wherein R is alkyl of 1 to 4 carbon atoms, $R_1$ is independently an electron withdrawing group selected from $-CF_3$, $-CN$,

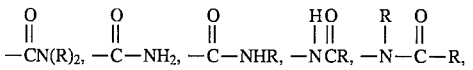

-continued

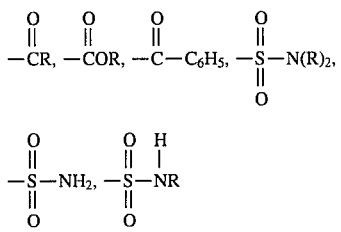

or halogen, y is 1 or 2 and q is 0 or 1, wherein the ratio of equivalents of amine NH groups in (b) to the equivalents of epoxide groups in (a) is 0.1 to 0.7, and (ii) a structural fiber.

21. A composite as defined in claim 20 wherein the epoxy resin was cured in the presence of an accelerator which increased the rate of cure.

22. A composite as defined in claims 20 or 21 which contains a thermoplastic polymer.

* * * * *